Feb. 9, 1932.   A. SPOHR ET AL   1,844,446
ROTARY CUTTER
Filed Jan. 16, 1929   2 Sheets-Sheet 1
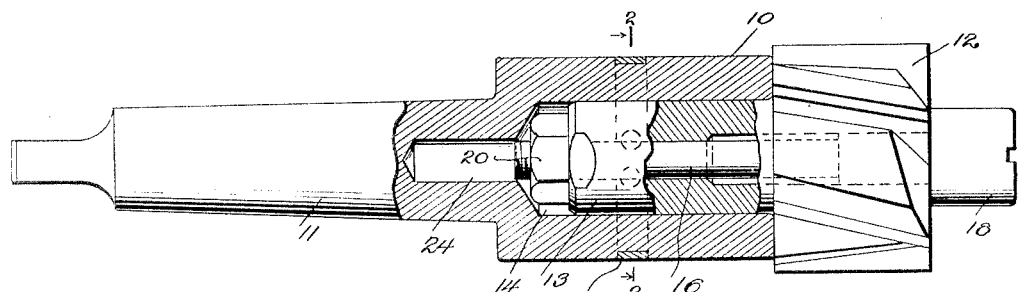
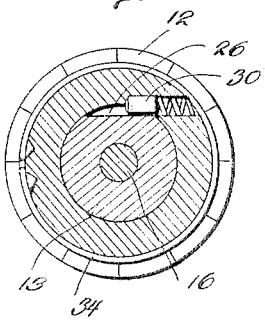   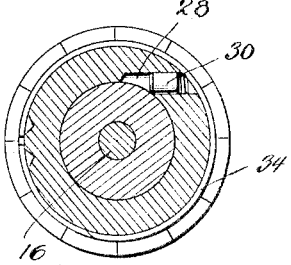
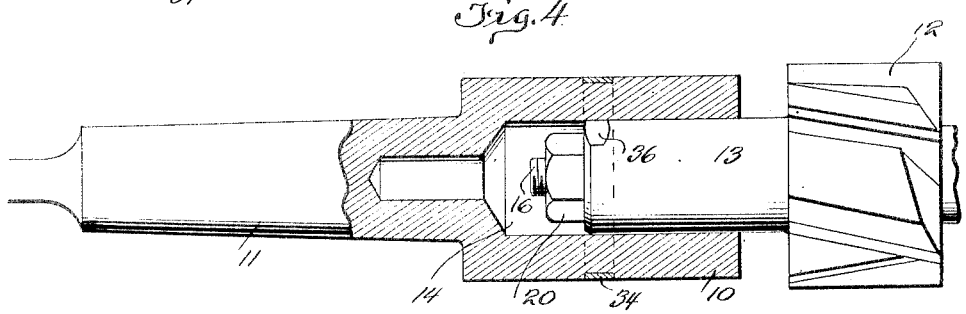
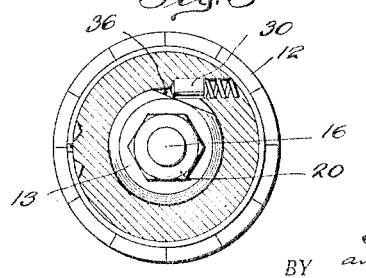
INVENTORS
Arthur Spohr
and
BY Lewis Skeel
Quesada
ATTORNEY.

Feb. 9, 1932. A. SPOHR ET AL 1,844,446
ROTARY CUTTER
Filed Jan. 16, 1929  2 Sheets-Sheet 2
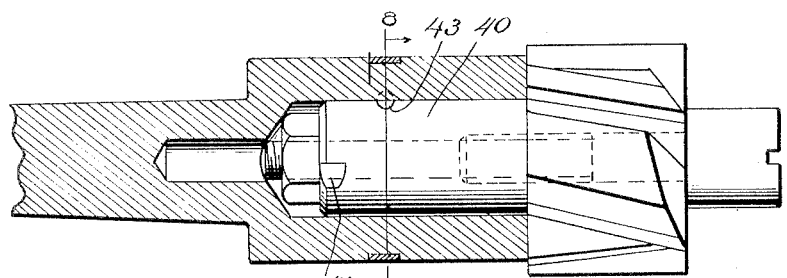
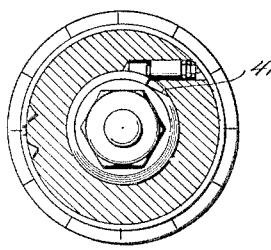 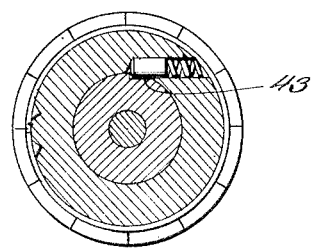
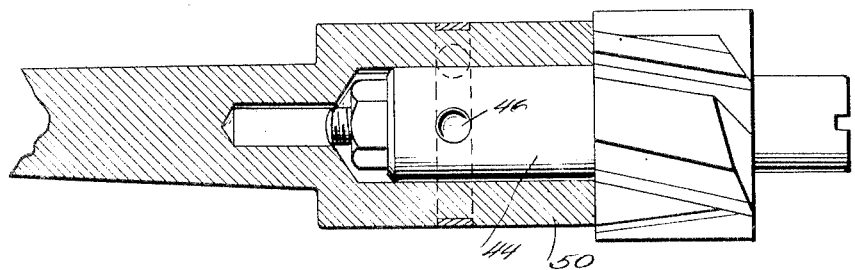
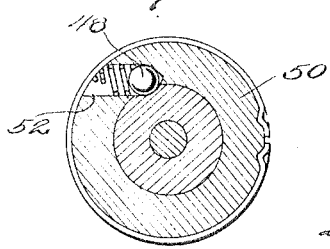
INVENTORS
Arthur Spohr
and Lewis Skeel
BY
ATTORNEY.

Patented Feb. 9, 1932

1,844,446

UNITED STATES PATENT OFFICE

ARTHUR SPOHR AND LEWIS SKEEL, OF MEADVILLE, PENNSYLVANIA

ROTARY CUTTER

Application filed January 16, 1929. Serial No. 332,788.

This invention relates to rotary cutters especially adapted for use in counterboring, spot facing and the like.

Briefly stated, an important object of the invention is to provide a rotary cutter in which the cutting element thereof, such as a counterboring head, may be connected reliably to or disconnected from the holder therefor with facility and ease so that the invention may be used advantageously where quantity production is a factor of major importance, the quick change feature being attained without, however, sacrificing other requisites in a tool of this character.

Another aim is to provide a rotary cutter of the character specified which is characterized by simplicity of design, a wide field of application and which is relatively cheap to manufacture and maintain.

Other objects and advantages will be apparent during the course of the following description.

In the accompanying drawings forming a part of this application and in which like numerals are employed to designate like parts throughout the same.

Figure 1 is a vertical sectional view through the improved tool, parts being in elevation, Figure 2 is a vertical transverse sectional view taken on line 2—2 of Figure 1, Figure 3 is a vertical transverse sectional view taken at the same point, the view illustrating the manner in which the cutter head shank may be disconnected from the holder, Figure 4 is a fragmentary vertical sectional view illustrating the introduction of the cutter head shank into the holder, Figure 5 is a vertical transverse sectional view illustrating the manner in which the driving pin is retracted as an incident to the introduction of the cutter head shank into the holder, Figure 6 is a fragmentary longitudinal sectional view illustrating a modification of the invention, Figure 7 is a sectional view illustrating the manner in which the driving pin may be retracted during the introduction of the cutter head shank into the holder, Figure 8 is a vertical transverse sectional view taken on line 8—8 of Figure 6, Figure 9 is a fragmentary longitudinal sectional view illustrating a further modification of the invention, Figure 10 is a vertical transverse sectional view through the form of invention illustrated in Figure 9.

In the drawings the numeral 10 designates a holder, the rear portion of which is provided with suitable means 11 by which the same may be connected to the driving spindle of a machine. The cutter head or element is designated by the numeral 12 and is permanently or otherwise joined with an attaching shank 13 which, as best illustrated in Figure 4, is designed to be introduced into the socket 14 of the holder.

The shank 13 is shown to be bored longitudinally for the full length thereof for the reception of the attaching stem 16 of a pilot head 18. Of course, the head 18 is positioned in advance of the cutter head 12 and serves the obvious purpose of guiding the cutter into proper engagement with the work. The rear terminal of the stem 16 is threaded for engagement by a nut 20 and as the cutter is worn away by use and repeated resharpening thereof, the threaded portion of the stem is received within a reduced extension 24 of the socket 14.

Attention is invited to Figure 2 which illustrates that the shank 13 is provided between the ends thereof with a transverse straight bottomed peripheral groove 26 adapted to be positioned in registration with a groove or socket 28. A driving pin 30 is positioned movably within the groove or socket 28 and when the transverse groove 26 is brought into register with such socket, the driving pin is advanced under the influence of the associated expansion spring to establish a driving connection between the holder and the cutter head.

Figure 3 clearly illustrates that the inner end of the groove or socket 28 terminates in what might be said to be a stop or shoulder by which inward movement of the pin 30 is limited. By thus limiting the inward movement of the pin 30, the inner end of such pin is held in position for engagement by the wall of the unoccupied portion of the groove 26 so that the pin may be retracted to release the shank 13 from the holder. In further alluding to this, it is pointed out that when it is desired to detach the cutter head from the holder, it is merely necessary to turn the same in a direction which will present the wall of the groove 26 to the inner end of the pin and continue such turning until the pin is removed entirely from the groove, whereupon the shank 13 may be withdrawn from the socket.

In carrying out the invention, the holder 10 may be grooved circumferentially to form a seat for a split retaining spring 34 by which outward movement of the driving pin and the spring is limited. The terminal portions of the spring 34 may be provided with suitable means to hold the spring against turning so that an unbroken or closed portion of the spring will remain over the groove 28.

Attention is now invited to Figures 4 and 5 which illustrate that the driving pin 30 may be retracted as an incident to the introduction of the shank 13 into the holder. The rear terminal portion of the shank 13 is provided with a diagonal flat 36 designed to be brought into engagement with the chamfered or otherwise reduced inner end of the pin whereby the pin may be retracted and the shank inserted to its full depth into the socket. After this, the transverse groove 26 is brought into register with the groove 28 so that the driving pin may advance to the position illustrated in Figure 2 and thereby establish a driving connection between the holder and the shank.

It is preferred that the rear face of the cutter head 12 be positioned flatly in engagement with the forward end of the holder 10 to transmit the end thrust directly from the cutter head to the holder and in this manner relieve the shank 13 and the driving pin of such end thrust.

The fact that the driving pin may be retracted merely as an incident to the introduction of the shank 13 into the holder or the removal of the shank from the holder makes it possible to change cutter heads with facility and a minimum loss of time without, however, sacrificing reliability, accuracy, simplicity and other considerations of importance in a tool of this character. Economy in first and maintenance costs is attained by the design of the tool and the structure is such that ease of manipulation along with a high degree of efficiency will be found inherent in the tool.

In the form of invention illustrated in Figures 6, 7 and 8, the shank 40 is provided at the chamfered rear portion thereof with a notch or flat 41 terminating abruptly at one end to define a shoulder or contact member for engagement with the inner end of the driving pin so that by turning the shank 40 in the proper direction as suggested in Figure 7 the driving pin may be retracted to allow of the full insertion of the shank into the holder.

Also, the pin receiving groove 43 corresponding to the groove 26 is shown in Figure 8 to terminate abruptly at the inner end thereof to define a shoulder or contact member by which the driving pin may be retracted. By this construction, the expeditous removal of the shank from the holder is made possible.

In the form of invention illustrated in Figures 9 and 10, the shank 44 is provided with a shallow conical recess or indentation 46 adapted for the reception of a spring pressed ball 48 carried by the holder 50. Specifically, the ball 48 is positioned within a groove 52 extending transversely of the holder and parallel to a tangent thereof so that the drive will be through the outer wall of the groove 52 and the opposed wall of the recess 46. The inner end of the groove 52 is shown to be formed with a stop by which the cross sectional area of the inner end of the groove 52 is restricted and the inward movement of the ball, in turn, limited.

The rear terminal portion of the attaching shank 44 is shown to be chamfered to define a cam-like member for engaging the ball 48 during the introduction of the shank into the holder so that the ball is retracted merely as an incident to the introduction of the shank.

When it is desired to detach the shank to sharpen the cutter head or to employ a new one, it is merely necessary for the operator to give the cutter head and the shank thereof a reverse turn to retract the driving ball 48 against the pressure of the associated spring and to then withdraw the shank from the holder.

From the foregoing, it is apparent that the invention forming the subject of this application is capable of a wide variety of mechanical expressions and it is therefore to be understood that the forms of invention herewith shown and described are to be taken merely as preferred examples of the same and that such minor changes in arrangement and construction of parts may be made as will remain within the spirit of the invention and the scope of what is claimed.

Having thus described the invention, what is claimed is:

1. In a rotary cutter, a holder, a cutting element having a shank detachably received in said holder and having the peripheral portion thereof formed with a straight transverse groove, and a spring pressed driving pin carried by said holder and adapted to be snugly received in said groove, there being means associated with said groove to engage the adjacent end of said pin to retract the pin, 2. In a rotary cutter, a holder having a socket, a cutting element having a shank for reception in said socket, said holder and the peripheral portion of said shank being provided with transverse grooves adapted to be located end to end substantially in longitudinal alignment, and a spring pressed driving pin in said grooves, one of said grooves being provided with a stop limiting movement of said pin.

3. In a rotary cutter, a holder having a socket, a cutting element having a shank for reception in said socket, the shank being provided between the ends thereof with a peripheral transverse groove and the adjacent portion of the holder being provided with a transverse groove for register with said first named groove, a spring pressed driving pin snugly received in said grooves, one of said grooves being extended beyond the pin whereby the wall of that groove may be brought into pressure engagement with one end of the pin.

4. In a rotary cutter, a holder having a socket, a cutting element having a shank for reception in said socket, the shank being provided between the ends thereof with a peripheral transverse groove and the adjacent portion of the holder being provided with a transverse groove for register with said first named groove, a spring pressed driving pin in said grooves and movable endwise therein, one of said grooves being extended beyond the pin whereby the wall of that groove may be brought into pressure engagement with one end of the pin, there being means carried by the holder to limit inward movement of said pin.

5. In a rotary cutter, a holder having a socket, a cutting element having a shank adapted to be received in said socket and being provided in the peripheral portion thereof with a groove having a straight bottom, a driving pin carried by said holder and adapted to extend longitudinally of said groove, said groove being extended beyond said pin whereby the shank may be turned to present the extended portion of the groove to the end of the pin to retract the pin.

6. In a rotary cutter, a holder having a socket, a cutting element having a shank adapted to be received in said socket and being provided in the peripheral portion thereof with a groove, a driving pin carried by said holder and adapted to extend longitudinally of said groove, said groove having a straight bottom extended beyond said pin whereby the shank may be turned to present the extended portion of said straight bottom of the groove to the end of the pin to retract the pin, one terminal portion of said shank being provided with means by which the pin may be retracted.

7. In a rotary cutter, a holder, a cutting element having a shank detachably received in said holder and having the peripheral portion thereof formed with a straight transverse groove open at both ends thereof, and a spring pressed driving pin carried by said holder and snugly received in said groove, a portion of said groove being extended beyond said pin and having a wall engageable with the inner end of the pin to retract the pin.

8. In a rotary cutter, a holder having a socket, a cutting element having a shank detachably received in said socket and having the peripheral portion thereof formed with a straight transverse groove, the holder being provided with a groove parallel to a tangent of the holder and opening into said socket and having the inner end thereof formed with a stop, a spring pressed driving pin in said second named grooove and adapted to be received in said first named groove, the stop at the inner end of said second named groove constituting a means to limit inward movement.

In testimony whereof we affix our signatures.

ARTHUR SPOHR.
LEWIS SKEEL.